Patented June 19, 1945

2,378,695

UNITED STATES PATENT OFFICE 2,378,695

METHOD OF COAGULATING SYNTHETIC RUBBER LATICES

Charles F. Fryling, Akron, Ohio, assignor to The B. F. Goodrich Company, New York, N. Y., a corporation of New York No Drawing. Application November 11, 1942, Serial No. 465,265

12 Claims. (Cl. 260—23)

This invention relates to the coagulation of synthetic rubber latices, and particularly to the coagulation of a latex prepared by polymerizing a butadiene-1,3 in the presence of a fatty acid soap as an emulsifying agent.

It is well known that synthetic rubber latices may be prepared by the emulsion polymerization of a polymerizable butadiene-1,3, including butadiene-1,3, commonly termed butadiene and its polymerizable homologues and analogues such as isoprene, piperylene, 2,3-dimethylbutadiene-1,3, and chloroprene, either alone or in admixture with each other and/or with one or more organic monomers copolymerizable therewith in aqueous emulsions such as acrylonitrile, methacrylonitrile, methyl acrylate, methyl methacrylate, styrene, methyl isopropenyl ketone, vinylidene chloride, etc. It is also known that the polymerization may be carried out in the presence of water-soluble fatty acid soaps such as sodium palmitate, potassium laurate, sodium oleate, ammonium oleate, sodium myristate, etc. The suggestion has also been made that synthetic rubber latices obtained by polymerization reactions effected in the presence of water-soluble fatty acid soaps be coagulated by means of an acid such as sulfuric acid, hydrochloric acid, acetic acid, etc. It is very difficult, however, to obtain satisfactory results by adding the synthetic rubber latex to an acid or an acid to the latex, for the coagulum is extremely sticky and is deposited in the form of large masses which are very difficult to wash and dry. It has also been proposed to coagulate synthetic rubber latices with salts of alkali metals. When water-soluble fatty acid soaps are used as the emulsifying agents, however, it may require a very large amount of salt to effect the coagulation, the coagulation is ordinarily not complete, and the coagulum which is formed is extremely difficult to filter and wash. These same difficulties are also encountered when a mixture of acid and salt are added simultaneously to the latex.

It is the principal object of this invention to provide a method whereby a synthetic rubber latex formed by the polymerization of a butadiene-1,3 in the form of an aqueous emulsion in the presence of an emulsifying agent comprising a water-soluble fatty acid soap may be coagulated in the form of crumbs of the desired size. It is a further object to provide a method whereby non-sticky crumbs which may be readily washed, filtered, and dried are formed when synthetic rubber latices are coagulated.

I have found that these and other objects may be attained by treating a synthetic rubber latex, prepared by the emulsion polymerization of a butadiene-1,3 in the presence of a water-soluble fatty acid soap, in such a manner that a layer of a water-soluble soap is deposited on the synthetic rubber particles and then liberating free fatty acid from the soap whereby the particles grow into crumbs of the desired size. The deposition of soap on the synthetic rubber particles is best effected by salting out the soap with a salt which forms a water-soluble soap such as a neutral inorganic salt of an alkali metal. As preferred salts may be mentioned sodium chloride and sodium sulfate which are inexpensive and readily available, although other inorganic alkali metal salts which have in aqueous solution a pH of about 7 may be employed if desired.

The amount of salt added may be varied over wide limits from only enough to precipitate a very thin layer of soap upon the particles to enough to cause coagulation of the latex. It is preferred, however, to employ insufficient salt to coagulate the latex irreversibly and completely. Enough salt may be employed to cause a separation of unstirred latex into a soap layer and a latex layer, but as long as the particles can be readily redispersed by merely diluting and stirring the latex, the preferred upper limit of salt concentration has not been exceeded. Even if the latex has been coagulated by the addition of salt, the particles may be caused to grow into crumbs of the desired size by the carefully controlled addition of acid. The amount of salt which will cause complete and irreversible coagulation depends upon a number of factors including the kind and concentration of butadiene-1,3 polymer in the latex and the kind and concentration of fatty acid soap used as the emulsifying agent.

The synthetic rubber particles may be supplied with a layer of soap in other manners than by salting-out the soap. The latex may be chilled until the solubility of the soap has been exceeded, for instance, or additional soap may be added to the latex.

The synthetic rubber particles containing a layer of soap are then treated with an acid in such a manner that free fatty acid is liberated from the soap and the particles grow together to form crumbs. This is best done while the particles are contained in a stirred brine solution. Any desired acid sufficiently strong to liberate fatty acid from soap may be employed, the mineral acids such as hydrochloric acid and sulfuric acid being preferred. Strong organic acids such as acetic and trichloroacetic acid, however, are also operable.

The size of the crumbs precipitated from synthetic rubber latex by the method of this invention may be regulated by variations in operating procedure. In general, it may be said that the use of large amounts of salt favors the production of crumbs of small particle size. The pH at which the acid is added also has an effect upon the size of the crumbs produced. If the acid is added rapidly so that the pH falls well below 7, to 4 or 5 for instance, the particle size of the crumbs will be larger than if the coagulation occurs at a pH of from 6 to 8.

It is often desirable to add a buffer along with the inorganic alkali metal salt to assist in maintaining the desired pH during the addition of the acid. Suitable buffers include sodium carbonate, disodium phosphate, etc. If desired, a buffer salt may be added to fulfill both of the functions of regulating the particle size and maintaining a constant pH, although it is preferable to have present a mixture of a neutral inorganic alkali metal salt and another salt which acts as a buffer when buffering action is desired.

The salt and the acid may be added to the latex in any desired manner provided that the salt has an opportunity to precipitate soap upon the synthetic rubber particles before coagulation due to the addition of the acid occurs. In a preferred embodiment of the invention, the acid is run into a mixture of the synthetic rubber latex and the salt at a rate which will maintain the pH of the latex at the desired level and accordingly produce crumbs of the desired size. If desired, separate streams of the latex and the acid may be introduced into brine in such a manner that the brine acts upon the latex prior to the coagulation of the latex by the acid.

The following specific examples illustrate the coagulation of two synthetic rubber latices by the method of this invention. It is to be clearly understood, however, that the invention is not limited thereto, and that other specific ways of utilizing the combined action of a salt and an acid to coagulate these and other synthetic rubber latices are within the spirit and scope of the invention.

*Example I*

A synthetic rubber latex containing 27% by weight of rubber was prepared by copolymerizing 75 parts by weight of butadiene-1,3 and 25 parts of styrene in the presence of about 5 parts of sodium myristate as the emulsifying agent. For the coagulation of about 1,000 gal. of latex, 350 lb. of sodium chloride were dissolved in 200 gal. of water in a coagulation vessel provided with a stirrer. Separate streams of the latex and a 2% aqueous solution of sulfuric acid were added at opposite sides of the coagulation vessel to the stirred salt solution at rates adjusted so that the pH of the bath was maintained between about 6 and 7. The latex introduced into the bath by this method was acted upon by the salt solution before being coagulated by the acid. The crumbs which were obtained after the coagulation was completed were between about 3 and 4 mm. in diameter, were not sticky, and could be much more readily washed, filtered, and dried than the coagulum formed by means of salt or acid alone or by adding the two materials to the latex simultaneously.

*Example II*

A synthetic rubber latex containing 29% by weight of rubber was prepared by copolymerizing 55 parts by weight of butadiene-1,3 and 45 parts of acrylonitrile in the presence of about 5 parts of sodium myristate as the emulsifying agent. For the coagulation of about 1,000 gal. of latex, 450 lb. of salt were dissolved in 200 gal. of water in a coagulation vessel provided with a stirrer, 30 lb. of sodium bicarbonate were added as a buffer, and the latex was added to the salt solution. A 1% aqueous solution of sulfuric acid was added to the stirred latex at a rate sufficiently slow to maintain the pH between 6.5 and 7.5 until the coagulation was complete. The coagulum was in the form of crumbs between about 3 and 4 mm. in diameter which were not sticky and could be readily washed, dried, and filtered.

I claim:

1. In a method of coagulating a synthetic rubber latex prepared by the emulsion polymerization of a member of the class consisting of butadiene-1,3, isoprene, piperylene, 2,3-dimethylbutadiene-1,3 and chloroprene, in the presence of a water-soluble fatty acid soap, the steps which comprise salting out a layer of water-soluble fatty acid soap upon the particles of synthetic rubber in the synthetic rubber latex, and then acidifying the soap-containing particles to liberate fatty acid from the soap whereby the particles grow into crumbs of the desired size.

2. In a method of coagulating a synthetic rubber latex prepared by the emulsion polymerization of butadiene-1,3 in the presence of a water-soluble fatty acid soap, the steps which comprise salting out a layer of water-soluble fatty acid soap upon the particles of synthetic rubber in the synthetic rubber latex, and then acidifying the soap-containing particles to liberate fatty acid from the soap whereby the particles grow into crumbs of the desired size.

3. In a method of coagulating a synthetic rubber latex prepared by the emulsion copolymerization in the presence of a fatty acid soap of butadiene-1,3 and an organic monomer copolymerizable therewith in aqueous emulsion, the steps which comprise salting out a layer of water-soluble fatty acid upon the particles of synthetic rubber in the synthetic rubber latex, and then acidifying the soap-containing particles to liberate fatty acid from the soap, whereby the particles grow into crumbs of the desired size.

4. The method of claim 3 in which the latex is prepared by the copolymerization of butadiene and styrene.

5. The method of claim 3 in which the latex is prepared by the copolymerization of butadiene and acrylonitrile.

6. The method of coagulating a synthetic rubber latex prepared by the copolymerization in an aqueous emulsion containing a fatty acid soap of butadiene-1,3 and an organic monomer copolymerizable therewith in aqueous emulsion, which comprises adding a neutral inorganic alkali metal salt to said latex to deposite a layer of fatty acid soap upon the synthetic rubber particles, and then acidifying the latex with a mineral acid to complete the coagulation and to liberate fatty acid from the soap deposited on the particles whereby the particles grow into crumbs of the desired size.

7. The method of coagulating a synthetic rubber latex prepared by the emulsion polymerization of butadiene-1,3 in the presence of a water-soluble fatty acid soap which comprises mixing said latex with a neutral inorganic alkali metal salt in an amount insufficient to coagulate the latex and then coagulating the latex by adding an acid thereto.

8. The method of coagulating a synthetic rubber latex prepared by the copolymerization in an aqueous emulsion containing a fatty acid soap of butadiene-1,3 and an organic monomer copolymerizable therewith in aqueous emulsion, which comprises mixing said latex with a neutral inorganic alkali metal salt in an amount insufficient to coagulate the latex and then coagulating the latex by adding a mineral acid thereto.

9. The method of claim 8 in which the latex is prepared by the copolymerization of butadiene-1,3 and styrene.

10. The method of claim 8 wherein the salt is an alkali metal halide.

11. The method of claim 8 wherein the latex is prepared by the copolymerization of butadiene-1,3 and acrylonitrile.

12. The method of coagulating a synthetic rubber latex prepared by the emulsion polymerization of butadiene-1,3 in the presence of a water-soluble fatty acid soap which comprises mixing said latex with a neutral inorganic alkali metal salt and a buffer in an amount insufficient to coagulate the latex, and then coagulating the latex by adding a mineral acid thereto.

CHARLES F. FRYLING.